(12) United States Patent
Hong

(10) Patent No.: US 10,205,477 B1
(45) Date of Patent: Feb. 12, 2019

(54) OSTEOACUSIS FINGER RING

(71) Applicant: ADVANCED PLUS GROUP LTD, SHENZHEN, GUANGDONG (CN)

(72) Inventor: Gui Hong, Li County (CN)

(73) Assignee: ADVANCED PLUS GROUP LTD, Shenzhen, Guangdong Province (CN)

( * ) Notice: Subject to any disclaimer, the term of this patent is extended or adjusted under 35 U.S.C. 154(b) by 0 days.

(21) Appl. No.: 16/037,471

(22) Filed: Jul. 17, 2018

(51) Int. Cl.
| H04M 1/00 | (2006.01) |
| H04B 1/3827 | (2015.01) |
| A44C 9/00 | (2006.01) |
| H04W 4/80 | (2018.01) |

(52) U.S. Cl.
CPC ........... *H04B 1/385* (2013.01); *A44C 9/0053* (2013.01); *H04B 2001/3861* (2013.01); *H04W 4/80* (2018.02)

(58) Field of Classification Search
CPC ...... H04B 1/3833; H04B 1/385; A44C 9/0053
See application file for complete search history.

(56) References Cited

U.S. PATENT DOCUMENTS

| 9,711,060 B1 * | 7/2017 | Lusted .................. G09B 19/00 |
| 2016/0156603 A1 * | 6/2016 | Janik .................. H04L 63/0492 726/7 |
| 2018/0204445 A1 * | 7/2018 | Bereshchanskiy ....... A44C 9/00 |

* cited by examiner

*Primary Examiner* — Shantell L Heiber
(74) *Attorney, Agent, or Firm* — Li & Cai Intellectual Property (USA) Office

(57) ABSTRACT

Disclosed is an osteoacusis finger ring, including a finger ring body and a first communication device. The finger ring body has a recess thereon, two end portions of the recess are respectively disposed with a clamping protrusion part, and the whole finger ring is in a C shape. Two lugs are formed at the bottom of the first communication device, and the lug is disposed with a fitting groove at the internal side thereof. The first communication device includes a shell, a display unit, a switch unit, a circuit board, and a conducing colloid. The circuit board is disposed with a Bluetooth communication unit, a pickup unit, and an osteoacusis vibrator. The upper end of the conducing colloid is attached to the osteoacusis vibrator, and the lower end of the conducting colloid passes through the accommodating hole and protrudes from the bottom of the shell.

11 Claims, 3 Drawing Sheets

OSTEOACUSIS FINGER RING

BACKGROUND

1. Technical Field

The present disclosure relates to a Bluetooth answering device, in particular, to an osteoacusis finger ring.

2. Description of Related Art

Conventionally, when communicating with others by virtue of cell phones or other communication devices, people use either speakers of cell phones or earphones to restore signals to acoustic waves to transmit to one's auricularis. The method, however, has drawbacks. One is that a long-term usage of speakers of cell phones, in particular the way people use earphones, would cause damage to the auricularis and thus result in hearing loss of people. Another drawback is that in certain occasions which are inappropriate for using cell phone such as at meetings, it is not easy to aware of incoming calls, and unanswered calls would arise unnecessary misunderstanding towards the caller.

SUMMARY

The object of the present disclosure is to provide an osteoacusis finger ring to resolve at least one of the existing technical problems of conventional answering devices. In addition, the osteoacusis finger ring provided by the present disclosure can be manufactured conveniently.

For the sake of achieving the aforementioned object, the present disclosure provides the technical solutions as follows.

According to one exemplary embodiment of the present disclosure, an osteoacusis finger ring is provided, including a finger ring body having a recess thereon, clamping protrusion parts are disposed at two ends of the recess, respectively, the whole finger ring being in a C shape; and a first communication device, two lugs formed downwardly along two opposite side edges at the bottom of the first communication device, the lug disposed with a fitting groove at the internal side thereof, the first communication device including a shell having an accommodating hole at the bottom thereof, a display unit, a switch unit, a circuit board fixed in the shell, and a conducing colloid; the circuit board disposed with a Bluetooth communication unit and a pickup unit, an osteoacusis vibrator, disposed on the bottom of the circuit board, and the upper portion of the conducing colloid attached to the osteoacusis vibrator and the lower portion of the conducting colloid passing through the accommodating hole and protruding from the bottom of the shell.

In a preferred embodiment, the circuit board is disposed with a signal processing unit, and the signal processing unit is connected with the switch unit and configured to produce first information according to a signal from the switch unit, and then the first information is transmitted to a second communication device which is paired with the osteoacusis finger ring through the Bluetooth communication unit, so as to control the second communication device to refuse to answer an incoming call while sending a message to the caller.

In a preferred embodiment, the quantity of the switch unit is one and the signal processing unit is to produce the first information according to the switching frequency of the switch unit within a preset switch time.

In a preferred embodiment, the quantity of the switch unit is two or more, and wherein one of the switch units is used for controlling the signal processing unit to produce the first information and the others of the switch units are used to control the signal processing unit to produce second information for answering incoming calls and other information.

In a preferred embodiment, the switch unit is a push type switch or a touch type switch.

In a preferred embodiment, the switch unit is an opto-electronic switch including a light emitting element and a light receiving element.

In a preferred embodiment, the shell of the first communication device comprises an upper shell and a lower shell which are clamped with each other; the lower shell has a slot-shaped main body, and the upper shell comprises a cover plate portion and two side plate portions which are respectively fitted to two ends of the slot-shaped main body.

In a preferred embodiment, the display unit is a diode, and the display unit and the switch unit are supported at the side of the slot-shaped main body.

In a preferred embodiment, the circuit board is disposed with a conductive pillar used for the charging function, and the end of the conductive pillar is exposed from the bottom of the lower shell.

Compared with the conventional technology, the present disclosure has the following advantages.

The osteoacusis finger ring of the present disclosure is in communication with cell phones or other communication devices through a Bluetooth communication unit and transmits audio signals to finger, so that an incoming call can be perceived by the auricular nerve through the contact with the finger, cranial bone, or ear, thereby effectively preventing the eardrum from suffering damage. In addition, the osteoacusis finger ring is applicable to certain occasions which are inappropriate for using cell phone such as at meetings.

Further, the present disclosure is designed with separate parts, that is, the osteoacusis finger ring consists of the finger ring body and the first communication device. Compared with traditional designs such as an integral structure, the osteoacusis finger ring provided by the present disclosure simplifies the entire structure, thus facilitating the manufacturing method and the fabrication process.

Moreover, when the user is not convenient to answer an incoming call, the osteoacusis finger ring provided by the present disclosure can control the cell phone to refuse to answer the incoming call while sending a message to the caller, thereby avoiding unanswered calls giving rise to unnecessary misunderstanding toward the caller.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
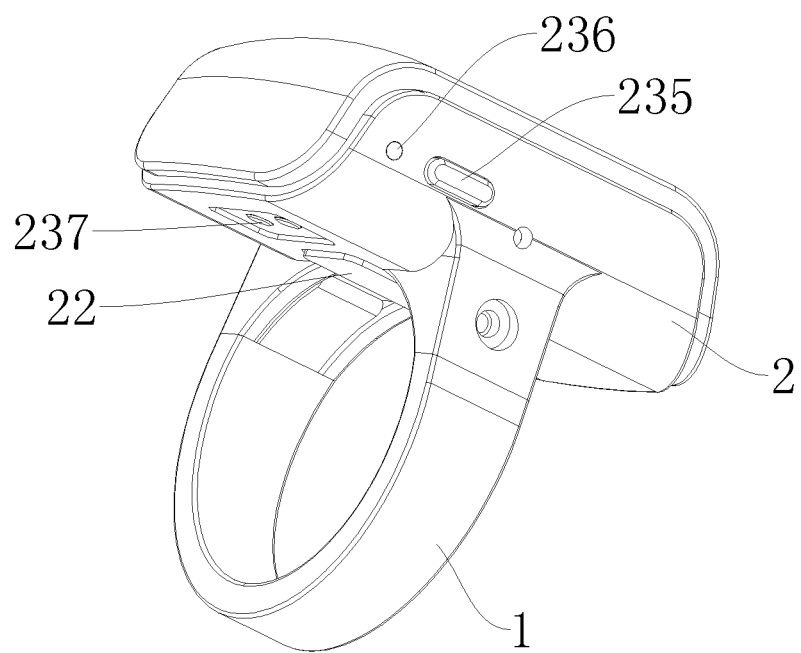
FIG. 1 is a structural schematic diagram of the osteoacusis finger ring of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Figure 2:
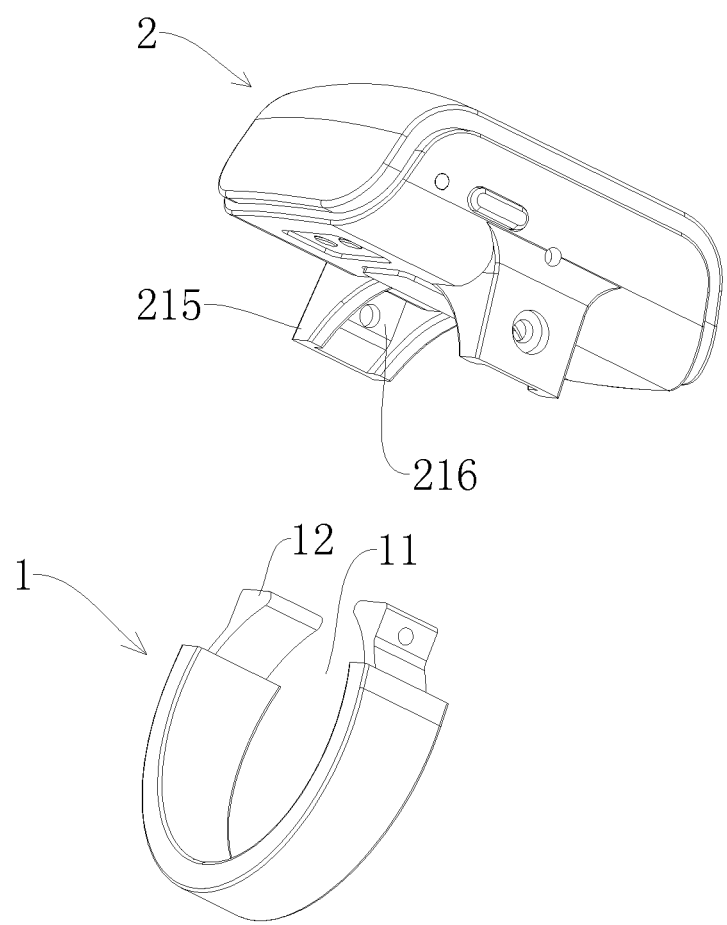
FIG. 2 is a schematic diagram of the finger ring body after detaching from the first communication device.
Figure 3:
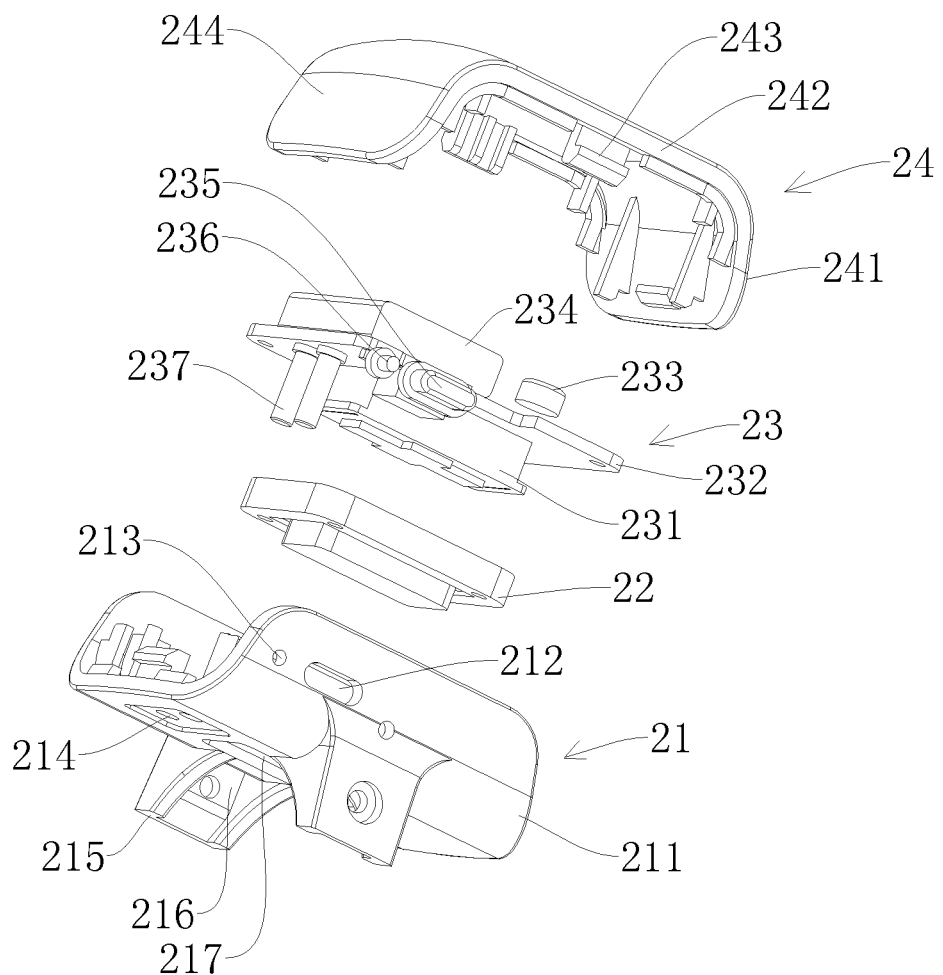
FIG. 3 is an exploded diagram of the first communication device.

Reference is made to FIG. 1 to FIG. 3, which illustrates that the osteoacusis finger ring of the present disclosure includes a finger ring body 1 and a first communication device 2.

The finger ring body 1 has a recess 11, and clamping protrusion parts 12 are disposed at two ends of the recess 11, respectively, and the whole finger ring body 1 is in a C shape.

Two lugs 215 are formed downwardly along two opposite side edges at the bottom of the first communication device 2, and the lug 215 is disposed with a fitting groove 216 at the internal side thereof. The lug 215 is fitted to the fitting groove 216 so that the first communication device 2 can be arranged in the recess 11 of the finger ring body 1. By pressing the recess 11 of the finger ring body 1, the clamping protrusion parts 12 can clamp the fitting groove 216 or be detached from the fitting groove 216, thereby facilitating to assemble the finger ring body 1 with the first communication device 2 or detach the finger ring body 1 from the first communication device 2.

The first communication device 2 includes a shell having an accommodating hole 217 at the bottom thereof, a display unit 236, a switch unit 235, a circuit board 232 fixed in the shell, and a conducting colloid 22. The circuit board 232 is disposed with a Bluetooth communication unit and a pickup unit 233, and an osteoacusis vibrator 231 is disposed on the bottom of the circuit board 232. The upper portion of the conducting colloid 22 is attached to the osteoacusis vibrator 231 and the lower portion of the conducting colloid 22 passes through the accommodating hole 217 and protrudes from the bottom of the shell. The switch unit 235 can switch on incoming calls, and the pickup unit 233 is used to convert sounds into audio signals and send the audio signals to the communication counterpart.

When in use, the user wears the osteoacusis finger ring on one of the fingers, and the osteoacusis finger ring is paired with a second communication device (i.e. a cell phone or other communication devices) through a Bluetooth communication so as to establish a wireless communication connection. When an incoming call is sent to the osteoacusis finger ring, and after the incoming call is switched on, the audio signal of the incoming call is converted into vibration by the osteoacusis vibrator 231 and then the vibration is transmitted to the finger through the conducting colloid 22, so that the incoming call can be perceived by the auricular nerve through the contact with the finger, cranial bone, or ear. Compared with conventional methods of sending incoming calls to the eardrum through acoustic waves, the technical solution provided by the present disclosure can effectively prevent the eardrum from suffering damage. In addition, since the osteoacusis finger ring is wore on the user's finger, by means of the present disclosure the user can aware of incoming calls and control to answer the calls without operating the cell phone. Moreover, the present disclosure is also applicable to certain occasions which are inappropriate for using cell phone such as at meetings.

Further, the present disclosure is designed with separate parts, that is, the osteoacusis finger ring consists of the finger ring body 1 and the first communication device 2. Compared with traditional designs such as an integral structure, the osteoacusis finger ring provided by the present disclosure simplifies the entire structure, thus facilitating the manufacturing method and the fabrication process.

Under certain circumstances, such as driving, it is not supposed to answer incoming calls, but unanswered calls may cause unnecessary misunderstanding towards the caller. In a preferred embodiment of the present disclosure, the circuit board 232 is further disposed with a signal processing unit. The signal processing unit is connected with the switch unit 235 and is used to produce first information according to the signal from the switch unit 235, and then the first information is transmitted to the second communication device which is paired with the osteoacusis finger ring through a Bluetooth communication unit, so as to control the second communication device to refuse to answer the incoming call while sending a message to the caller. The message can contain preset contents such as "I am not available now, and will call you back soon" and the like. By virtue of the solution, the user only needs to press the switch unit 235 to send the message to the caller without operating the cell phone.

The quantity of the switch unit 235 is one in the present embodiment, and the signal processing unit is set to produce the first information according to the switching frequency of the switch unit 235 within a preset switch time. For example, when the switching frequency is two, the first information is produced; and when the switching frequency is one, the second information for answering incoming calls is produced.

In another preferred embodiment, the quantity of the switch unit 235 is two, in which one is used for controlling the signal processing unit to produce the first information and the other is used to control the signal processing unit to produce the second information for answering incoming calls. In other embodiments, multiple switch units 235 are applied and used to produce other control information.

The switch unit 235 is a push type switch. In a preferred embodiment, the switch unit 235 can be a touch type switch, and in another preferred embodiment, the switch unit 235 can be an optoelectronic switch including a light emitting element and a light receiving element.

The shell of the first communication device 2 consists of an upper shell 24 and a lower shell 21 which are clamped with each other. The lower shell 21 has a slot-shaped main body 211, and the upper shell 24 includes a cover plate portion 242 and two side plate portions 241, 244 which are respectively fitted to two ends of the slot-shaped main body 211. A clamping buckle 243 is arranged along the side edge of the cover plate portion 242.

The display unit 236 is a diode, and the display unit 236 and the switch unit 235 are respectively arranged in a first installation hole 213 and a second installation hole 212, in which the first installation hole 213 and the second installation hole 212 are supported at the side of the slot-shaped main body 211. In other embodiments, the display unit 236 can be a display screen such as a crystal display screen.

In addition, the circuit board 232 is disposed with a conductive pillar 237 used for the charging function, and the end of the conductive pillar 237 is exposed from the bottom of the lower shell 21 for being connected with an external power so as to charge an internal battery 234.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. An osteoacusis finger ring, comprising:
a finger ring body having a recess thereon, clamping protrusion parts are disposed at two ends of the recess respectively, the whole osteoacusis finger ring being in a C shape; and
a first communication device, two lugs formed downwardly along two opposite side edges at the bottom of the first communication device, a fitting groove disposed at the internal side of the lug, the first communication device including a shell having an accommodating hole at the bottom thereof, a display unit, a switch unit, a circuit board fixed in the shell, and a conducing colloid; wherein the circuit board is disposed with a Bluetooth communication unit and a pickup unit, wherein an osteoacusis vibrator is disposed on the bottom of the circuit board, and the upper end of the conducing colloid attached to the osteoacusis vibrator and the lower end of the conducting colloid passing through the accommodating hole and protruding from the bottom of the shell.

2. The osteoacusis finger ring according to claim 1, wherein the circuit board is disposed with a signal processing unit, and the signal processing unit is connected with the switch unit and configured to produce first information according to a signal from the switch unit, and then the first information is transmitted to a second communication device which is paired with the osteoacusis finger ring through the Bluetooth communication unit, so as to control the second communication device to refuse to answer an incoming call while sending a message to the caller.

3. The osteoacusis finger ring according to claim 2, wherein the quantity of the switch unit is one and the signal processing unit is configured to produce the first information according to the switching frequency of the switch unit within a preset switch time.

4. The osteoacusis finger ring according to claim 3, wherein the switch unit is a push type switch or a touch type switch.

5. The osteoacusis finger ring according to claim 3, wherein the switch unit is an optoelectronic switch including a light emitting element and a light receiving element.

6. The osteoacusis finger ring according to claim 2, wherein the quantity of the switch unit is two or more, and wherein one of the switch units is configured for controlling the signal processing unit to produce the first information and the others of the switch units are configured for controlling the signal processing unit to produce second information for answering incoming calls and other information.

7. The osteoacusis finger ring according to claim 6, wherein the switch unit is a push type switch or a touch type switch.

8. The osteoacusis finger ring according to claim 6, wherein the switch unit is an optoelectronic switch including a light emitting element and a light receiving element.

9. The osteoacusis finger ring according to claim 1, wherein the shell of the first communication device comprises an upper shell and a lower shell which are clamped with each other; and wherein the lower shell has a slot-shaped main body, and the upper shell comprises a cover plate portion and two side plate portions which are fitted to two ends of the slot-shaped main body, respectively.

10. The osteoacusis finger ring according to claim 9, wherein the display unit is a diode, and the display unit and the switch unit are supported at the side of the slot-shaped main body.

11. The osteoacusis finger ring according to claim 9, wherein a conductive pillar is disposed on the circuit board and configured for the charging function, and the end of the conductive pillar is exposed from the bottom of the lower shell.

* * * * *